No. 635,672. Patented Oct. 24, 1899.
F. B. DEANE.
BALE COVERING.
(Application filed Mar. 24, 1898.)
(No Model.)

Witnesses
Sidney P. Hollingsworth
Arthur B. Seibold

Inventor
Francis B. Deane
by G.H.W.T. Howard
Attorneys.

THE NORRIS PETERS CO., PHOTO-LITHO., WASHINGTON, D. C.

UNITED STATES PATENT OFFICE.

FRANCIS B. DEANE, OF LYNCHBURG, VIRGINIA.

BALE-COVERING.

SPECIFICATION forming part of Letters Patent No. 635,672, dated October 24, 1899.

Application filed March 24, 1898. Serial No. 675,007. (No model.)

*To all whom it may concern:*

Be it known that I, FRANCIS B. DEANE, of the city of Lynchburg, in the county of Campbell and State of Virginia, have invented certain new and useful Improvements in Bale-Coverings, of which the following is a specification, reference being had to the accompanying drawings and to the numerals of reference marked thereon.

My invention has reference to a covering for bales, it being more especially designed to afford a better protection for bales of cotton, textile, and other materials capable of compression against weather, fire, depredation, and soiling in handling.

My invention has reference to a bale-cover more especially designed to afford a better protection for cotton, textile, and other materials capable of compression against weather, fire, depredation, and soiling in handling, and which cover can be readily opened without detriment to itself when access is desired to the inclosed material for the purpose of examination and sampling.

Figure 1:
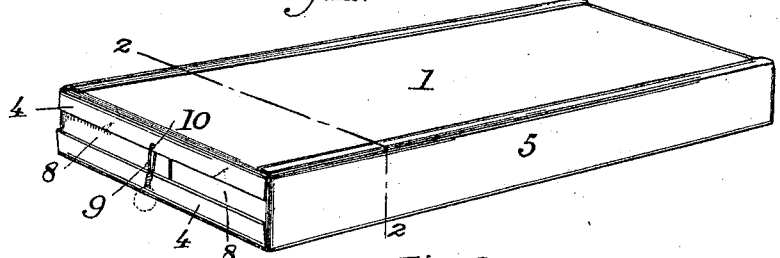
Figure 2:
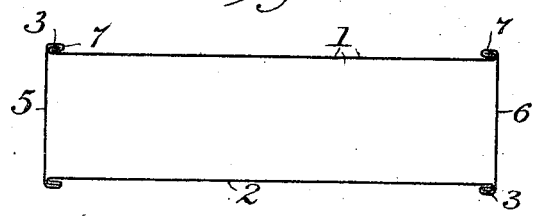
Figure 3:
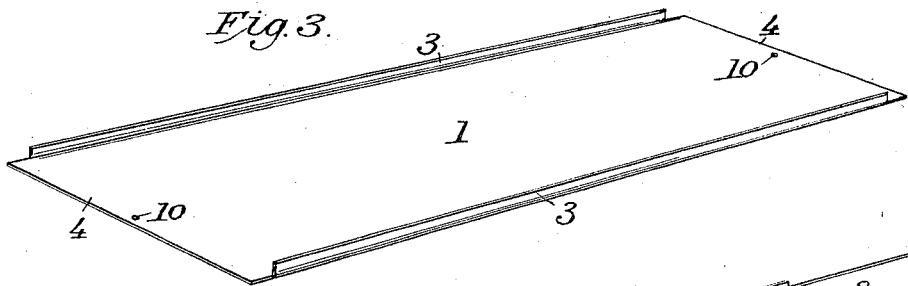
Figure 4:
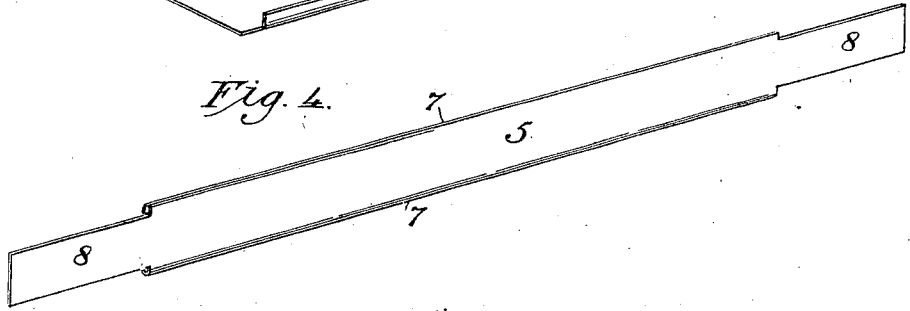
Figure 5:
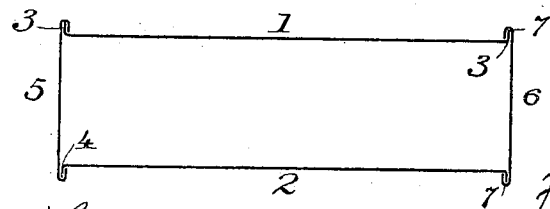

Referring to the accompanying drawings, Figure 1 is a perspective view of my improved bale-covering as it appears when in use. Fig. 2 is a cross-section on line 2 2 of Fig. 1. Fig. 3 is a perspective view of one of the plates which form the covering. Fig. 4 is a similar view of another plate, the function of which is hereinafter described. Fig. 5 is a cross-section through a bale, showing the covering-plates applied thereto as they appear before the interlocking edges are secured together.

Similar numerals of reference indicate similar parts in the various figures.

The top plate 1 and the bottom plate 2 are similar to each other in all respects, each plate consisting of a sheet of thin metal, such as steel, having a width substantially that of the bale to be inclosed, but a length somewhat greater. The sides of the plates 1 2 are provided with flanges 3, turned at right angles to the said plates, as shown in Figs. 3 and 5, while the ends 4 of each plate, which extend a short distance beyond the ends of the flanges 3, are adapted to be turned against the ends of the bale, as indicated in Fig. 1.

Plates 5 and 6, which form the sides of the bale-covering and which are similar to each other, have their sides turned to form U-shaped flanges 7, (see Figs. 4 and 5,) while their ends 8 project a suitable distance beyond the said flanges for a purpose hereinafter explained.

The covering is applied to a bale in the following manner: The bottom sheet 2, with its flanges 3 projecting downwardly, is put on the bed of a suitable compressing-machine and the material to be baled is placed wholly or in part thereon. If the entire amount of material to form a bale is to be compressed at one operation, the top plate 1, with its flanges 3 turned upwardly, is then placed on the material and the whole subjected to compression. Should, however, the material be compressed by a series of operations, the quantity of material being increased after each operation, the top plate 1 will not be applied until the entire amount has been subjected to compression. After the top and bottom plates have been adjusted in position and the material compressed sufficiently the side plates 3 6 are then attached to the top plate 1 and the bottom plate 2 by hooking the U-shaped flanges 7 of the side plates over the straight flanges 3 of the top and bottom plates, as represented in Fig. 5. The interlocking flanges are afterward turned down flat upon the top and bottom plates, as indicated in Figs. 1 and 2, by any convenient means, thereby firmly connecting together the several plates and holding them against separation. The ends 8 of the side plates 5 are at the same time bent around the ends of the bale, their length being sufficient to overlap each other and protect the material from exposure. As a further means of safety, the ends 4 of the top and bottom plates are turned over the ends 8 and secured by means of a wire or seal 9, passing through holes 10 in the ends 4. (See Figs. 1 and 3.)

There are many advantages in a bale-covering of this character over the ordinary textile covering, among which may be mentioned that of first cost, which in baling cotton is less than that for the jute covering and ties. The risk from fire is reduced to the minimum, as the material is so tightly packed and inclosed within a metallic envelop that no combustible material is left exposed. The inclosed covering also protects the material from inclement weather, absorption of moisture, and soiling by handling, and finally robbery of material, which may be committed by cutting the ordinary textile covering of the bales, is rendered practically impossible.

Having described my invention, I claim—

A closed covering, envelop or package for cotton or other similar material, the top and bottom of which are formed by sheet plates 1, 2 and the sides by plates 5, 6, the connection of the top, bottom and side plates being made by inwardly-turned lap-joints as shown, and the ends formed by the inwardly-folded ends 4 of the top and bottom plates and the ends 8, 8 of the side plates, the whole being constructed and arranged substantially as hereinbefore described.

In testimony whereof I hereunto set my hand this 18th day of March, 1898.

FRANCIS B. DEANE.

Witnesses:
WM. BEASLEY,
T. B. PRESTON.